Sept. 23, 1952 J. H. KNOWLES 2,611,646
DISTRIBUTOR FOR TRICKLING FILTERS
Filed Nov. 20, 1947 3 Sheets-Sheet 1
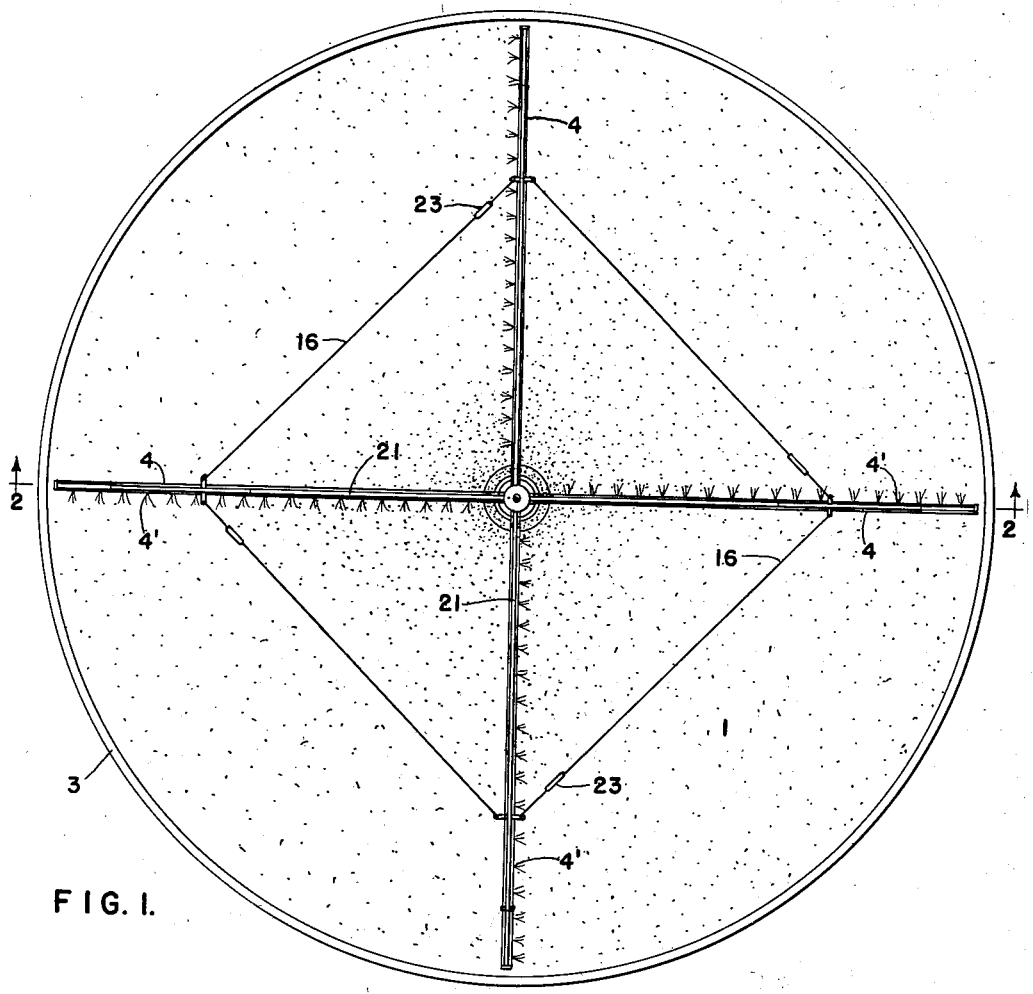
FIG. 1.
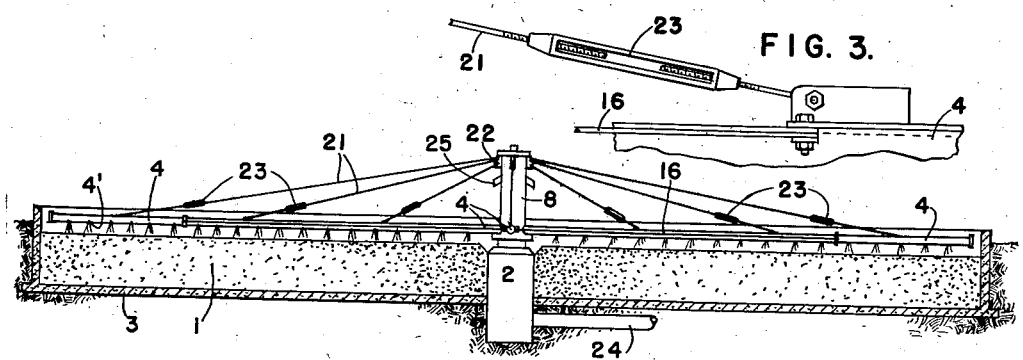
FIG. 3.
FIG. 2.
INVENTOR:
JOHN H. KNOWLES,
BY
Arthur Middleton
ATTORNEY Sept. 23, 1952 J. H. KNOWLES 2,611,646
DISTRIBUTOR FOR TRICKLING FILTERS
Filed Nov. 20, 1947 3 Sheets-Sheet 2
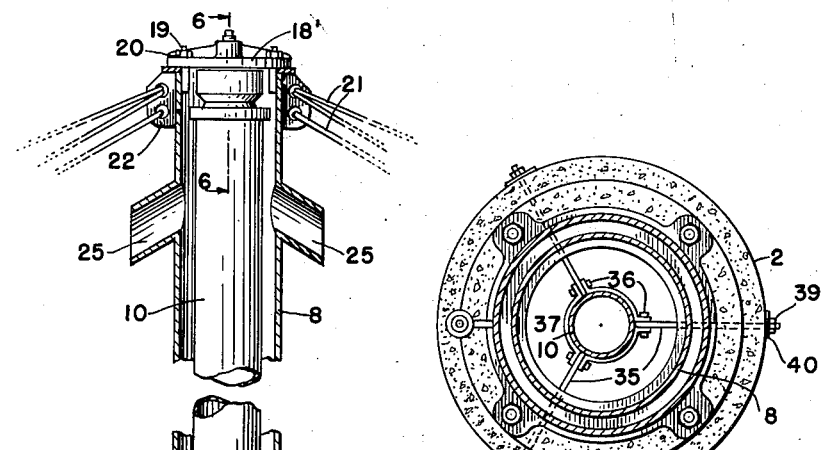
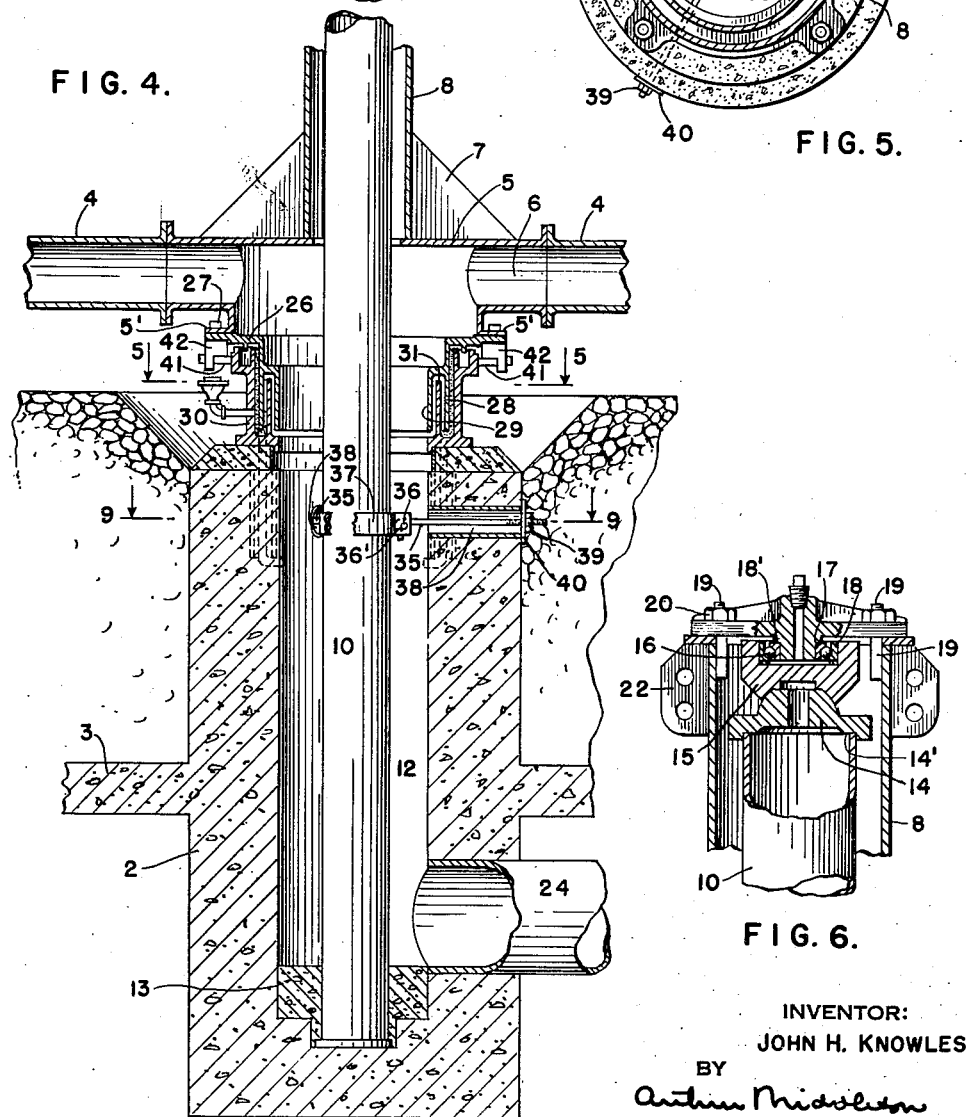
INVENTOR:
JOHN H. KNOWLES,
BY
Arthur Middleton
ATTORNEY Sept. 23, 1952  J. H. KNOWLES  2,611,646
DISTRIBUTOR FOR TRICKLING FILTERS
Filed Nov. 20, 1947  3 Sheets-Sheet 3

INVENTOR:
JOHN H. KNOWLES,
BY
Arthur Middleton
ATTORNEY

Patented Sept. 23, 1952

2,611,646

UNITED STATES PATENT OFFICE 2,611,646

DISTRIBUTOR FOR TRICKLING FILTERS

John Herbert Knowles, Larchmont, N. Y., assignor to The Dorr Company, Stamford, Conn., a corporation of Delaware Application November 20, 1947, Serial No. 787,165

4 Claims. (Cl. 299—69)

The present invention relates to liquid distributing devices for spraying liquid such as sewage on to filter beds or the like. More particularly, the invention relates to liquid distributors of the type comprising a distributing structure rotatable about a vertical axis and including hollow piping formed with discharge orifices at different distances from said axis and so directed that the reaction forces created by the liquid jets or spray streams discharged through said orifices will maintain the liquid distributor in rotation.

Liquid distributors of the general type and for the purpose mentioned above, are well known, and by way of example and illustration it is noted that one form of such a distributor is illustrated and described in Patent 2,215,181, granted September 17, 1940, on an application filed jointly by Harold B. Coulter and myself. Such distributors as heretofore constructed have customarily included vertically disposed hollow center piers or columns on the upper end of which a stationary bearing member is mounted for cooperation with a bearing member included in the rotary structure to form a thrust bearing through which the weight of the rotating structure is sustained, and through which any tendency to lateral displacement of the rotating structure is reduced.

The general object of the present invention is to provide improved means for supporting the rotating distributor structure. A more specific object of the present invention is to provide supporting means for the rotating structure comprising a vertical post or column within a hollow center pier and spaced away from the inner wall of the latter to form an annular liquid supply channel, through which the liquid to be distributed may pass upward to the hollow spray piping. In accordance with the present invention, the rotating structure is supported for rotation about a vertical axis by suitable bearing means including a bearing member carried by the center post at its upper end.

A more specific object of the invention is to provide simple and effective means for adjusting the center post relative to the center pier as required to insure that the axis of rotation of the rotating structure is coincident with or in suitably close proximity to the axis of the center post.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1 is a plan view of a filter and associated liquid distributor;

Fig. 2 is an elevation in section on the line 2—2 of Fig. 1;

Fig. 3 is an elevation on a larger scale than Fig. 1, illustrating a structural detail of the liquid distributor;

Fig. 4 is a sectional elevation on an enlarged scale of a portion of the apparatus shown in Fig. 1;

Fig. 5 is a horizontal section on the line 5—5 of Fig. 4;

Fig. 6 is a vertical section on the line 6—6 of Fig. 4;

Figure 7:
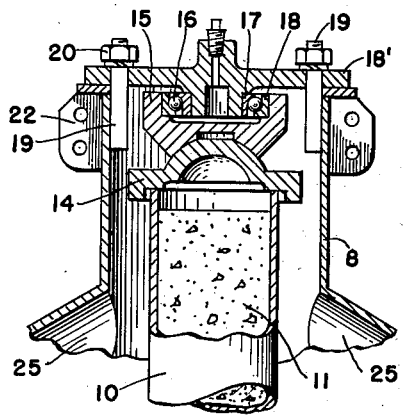
Fig. 7 is a section taken similarly to Fig. 6 and illustrating a modified center post construction.

The embodiment of the invention shown by way of example and in a somewhat diagrammatic manner, in Figs. 1 and 2, comprises a filter bed 1 in the form of an annulus surrounding the upper portion of a vertically disposed center pier 2, and comprising broken stone or like filter material held in a concrete container 3 open at its upper end. Associated with the filter bed is a liquid distributor comprising a plurality of horizontally disposed spray pipes or hollow arms 4 each having discharge orifices 4' at one side. As shown, there are four arms 4. Each arm is connected at its inner end to a chambered center member or element 5. The latter is rigidly connected to the lower end of a central uprising tubular shaft 8 included in the rotating structure comprising the arms 4 and center element 5. As shown, the shaft 8 has its lower end attached to the center element 5 by means comprising web or bracket plates 7 spaced about and extending radially away from the tubular element 8. The plates 7 have their vertical edges brazed or welded to the element 8, and have their horizontal lower edges brazed or welded to the generally horizontal upper side of the part 5.

Figure 9:
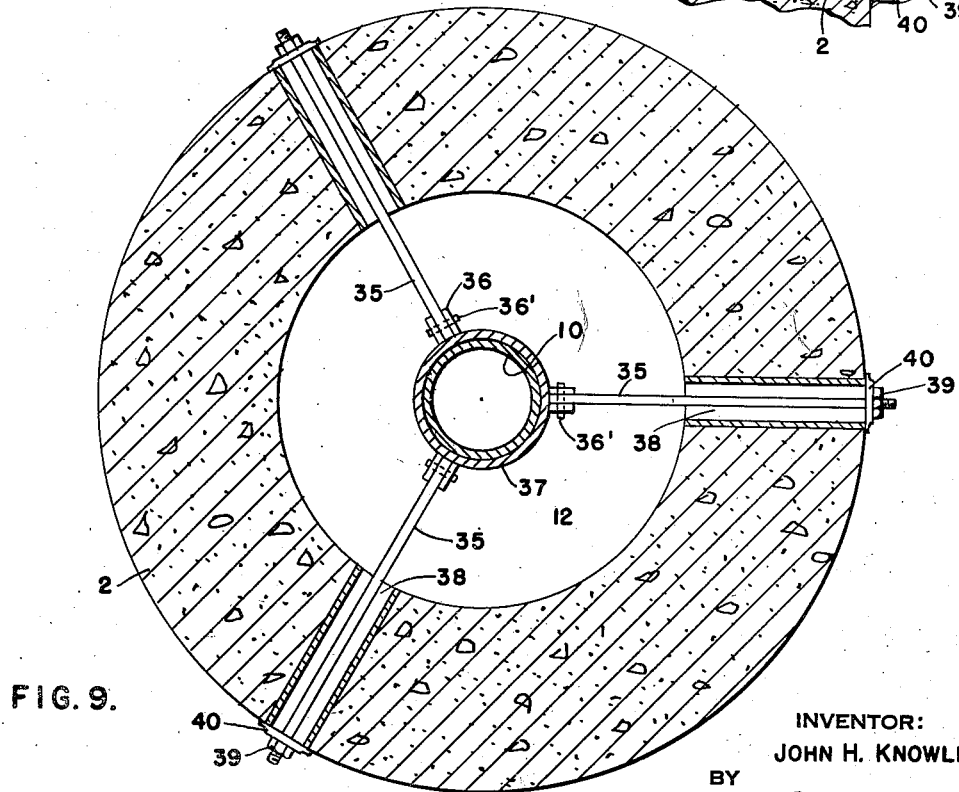
Fig. 9 is a section on the line 9—9 of Fig. 4.

The rotating structure is supported by, and rotates about the upper portion of a vertically disposed non-rotating center post 10, having its lower end suitably anchored. The post 10 comprises a tubular body of metal which may or may not have a strengthening and stiffening core of concrete 11, as shown in Fig. 7. As shown, the lower portion of the post 10 is axially disposed in the well or vertical bore 12 formed in the center pier 2. The inner diameter of said well or bore in the hollow center pier is substantially greater than the diameter of the post so as to provide an annular liquid space surrounding the post and having a horizontal cross-section which, as shown in Fig. 9, is several times as great as the horizontal cross-section of the post.

In the construction illustrated, the hollow center pier is formed of concrete and has an integral bottom portion forming the lower end wall of the well 12. The center post 8 is rigidly anchored in a body 13 of cement or the like put in place in the lower portion of the well, or at least allowed to harden therein only after the vertically disposed post 10 is put into position.

The rotating structure is supported by the center post 10, with freedom to rotate about the latter by connecting means including a thrust bearing at the upper end of the post. In the simple and effective form shown in Fig. 6, the connecting structure between the upper end of the post 10 and the tubular shaft member 8 comprises a metal cap member 14 above and extending across the upper end of the post 10, and having an underside recess 14' forming a seat for the upper end of the tubular body portion of the post 10. The cap 14 is formed at its upper side with a globular portion which enters and engages the concave underside of a superposed metal body 15. The latter is formed with a recess at its upper side to receive a ball bearing structure shown as comprising balls 16 mounted in the ball way formed by the inner and outer ball rings 17 and 18 shaped to cooperate with the balls to form a thrust bearing and a guide bearing. The outer ring 18 has its lower end in engagement with and supported by the member 15, and the inner ring has its upper end in engagement with a shoulder at the underside of a member 18'. The latter forms a cap portion of the tubular element 8. The inner surfaces of the two rings 17 are shaped to act in cooperation with the balls as a weight supporting thrust bearing. The member 18', as shown, is removably secured to the upper end of the tubular element 8 by bolts 19 having lower body portions welded against the inner walls of the member 8, and having threaded upper end portions extending through a horizontal portion of the member 18 and secured to the latter by nuts 20.

The hollow arms or spray pipes 4 are connected at their inner ends to the center part 5, and are supported at points adjacent their outer ends, and may be supported also at one or more points intermediate their ends, by stay rods 21 having their lower ends connected to the arms at said points, and having their upper ends connected to the upper end of the tubular element 8 as by means of bracket parts 22 welded to said element and formed with apertures in which the upper ends of the stay rods are secured. Advantageously, and as shown, each stay rod includes a turn buckle 23.

The liquid discharged through the spray orifices of the arms 4 is supplied through a supply pipe 24 which opens into the lower end of the center pier 12. The liquid thus supplied to the lower end of the annular well space flows upward through that space into center part 5 through a bottom opening in the latter, and thence into the open inner ends of the arms 4. When the pressure at which liquid passes through the pipe 24 into the valve 12 is excessive, some of the liquid entering the well may pass upward through the annular space between the center post 10 and the hollow shaft portion 8 of the housing to overflow or outlet spouts 25 secured to the element 8 adjacent the upper end of the latter, and each open at one end to the annular space between the shaft 8 and post 10.

As shown, the member 5 is formed with a bottom opening coaxial with and larger in diameter than the well 10. Said opening is surrounded by a short cylindrical portion of the member 5 which terminates at its lower end in an outturned horizontal flange 5' to which a rotating sealing member 26 is secured. The sealing member 26 comprises a horizontal out-turned flange at its upper end which is clamped against the underside of the flange 5', as by means of clamping bolts 27. The sealing member 26 also comprises two depending outer and inner cylindrical skirts 28 and 29 which are integrally connected at their upper ends and are spaced apart to provide an intermediate annular space open at its lower end. The rotating sealing member 26 cooperates with a stationary sealing member 30 mounted on the upper end of the hollow central pier 2. The member 30 comprises an outer cylindrical body larger in diameter than, and surrounding the outer skirt portion 28 of the rotating sealing member 26. The body or outer wall of the stationary sealing member 30 is integrally connected at its lower end to the lower end of an uprising cylindrical wall or inverted skirt portion 31 of the member 30. The body of the member 30 and its skirt portion 31 are spaced apart to provide an annular channel open at its upper end, and loosely receiving the outer cylindrical skirt or wall 28 of the rotating sealing member 26. The inner wall 31 of the lower sealing member extends into and is loosely received in the annular space between the outer and inner skirt portions 28 and 29 of the rotating sealing member. A sealing liquid, ordinarily mercury, held in the annular space between the outer and inner walls of the stationary sealing member 30, prevents the lighter liquid passed into the wall 12 by the pipe 24 from leaking through the joint space between the top of the wall 12 and the underside of the center part 5.

Figure 8:
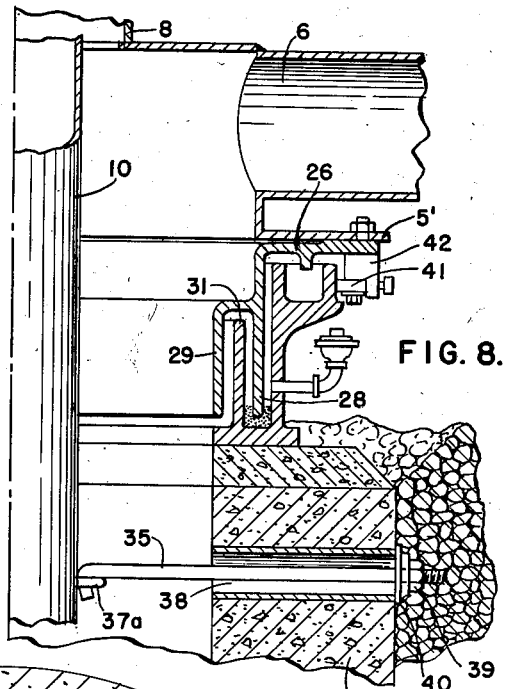
Fig. 8 is a vertical section on an enlarged scale of a slightly modified portion of the apparatus shown in Fig. 4.

To permit of lateral adjustment of the upper portion of the center post 10, the latter is connected intermediate its ends to positioning elements 35. As shown in Figs. 4 and 9, there are three elements 35 extending radially away from the post 10 and spaced 120° apart about the axis of the post 10. As shown, each positioning device 35 is, in effect, a stay bolt of adjustable length which has its inner end secured to the post 10 and its outer end secured to the center pier 2. As shown in Figs. 4 and 9, the inner end of each stay bolt 35 is bent to hook over a bolt 36' which connects the adjacent ends 36 of arc shaped sections of a ring 37 surrounding and fitting tightly about the center post 10 at a level somewhat below the upper end of the concrete center pier 2. In Fig. 8, the ring 37 and bolts 36' are replaced by bail like parts 37a having their legs secured to the center post 10. Each device 35 extends radially outward through a horizontal radial opening 38 formed in the hollow pier 2, and has a nut 39 on its threaded outer end which bears against the outer side of a washer-like member 40, which seats against the outer wall of the pier at the margin of the opening 38 through which the device 35 extends. As shown, said radial openings are lined by metal tubes. By suitably adjusting the various nuts 39, the axis of the post 10 may be brought into proper position.

To prevent any tendency, due to wind action or other cause, for the rotating structure to tilt out of the normal position in which the axes of the center post 10 and tube element 8 are in their desired coaxial relation, roller or other bearing may be suitably interposed between the rotating and stationary structures. Thus in the form of apparatus shown, bearing blocks 41 are secured to the rotating structure in the position to bear against the outer cylindrical surface of the upper portion of the stationary lower seal member 30. As shown, each bearing block 41 is secured to a bracket or coupling part 42 beneath and bolted to the outturned horizontal flange portion of the rotating sealing member 26, and a guide part in each bearing block 41 is adjustably secured to the supporting part 42 with its inner edge in contact with the surface member 30. As shown, each bracket 42 supports a screw which may be turned to adjust the corresponding block 41 relative to the bracket 42.

With prior arrangements in which a hollow central post has served both as a support for the rotating distributor element, and as a supply conduit for the liquid to be distributed, it has been found that the center post could not be made sufficiently strong or rigid without unduly increasing its bulk and inherent construction cost. A hollow center post serving as a liquid supply conduit must be formed with ports adjacent the distribution level for the passage of the liquid into the distributing arms or piping. Such ports reduce the rigidity of the center post, and make the structural design impractical when large volumes of flow are to be handled. With the liquid in-flow passage surrounding the center post, as disclosed herein, the flow capacity of the apparatus may be made as large, and the stationary supporting structure may be made as rigid as conditions make desirable. The liquid passing into the center pier wall 12 through the pipe 24 may be supplied under suitable pressure from an elevated reservoir or by suitable pumping means, as has been customary heretofore, and the usual provisions may be made for disposal of the liquid passing through the filter. Since the means for supplying liquid under pressure and for disposing of the liquid passed through the filter form no part of the present invention and may follow the usual practices of the prior art, they need not be illustrated or further referred to herein.

The general operation of the liquid distributor disclosed, does not differ essentially from that of previously known apparatus of the same general type, such as that disclosed in the above mentioned prior Patent 2,215,181. A desirable characteristic of apparatus of the type disclosed is its capacity for being rotated by the reactive forces due to the liquid jets discharged through the orifices 4', when the liquid in the spray pipes is under a moderate and readily maintained pressure head. To insure steady rotation and efficient liquid distribution, it is a practically essential condition that the rotating structure should be free to rotate about an axis passing through the center of gravity of the rotating structure. That condition is readily obtainable with the construction disclosed, since the different adjusting elements 35 may be relatively adjusted as required to so laterally position the thrust bearing at the top of the center post that the vertical line including the center of gravity of the rotating structure will be coincident with the axis of the cylindrical surface of the member 30 lightly engaged by the bearing blocks 41.

Owing to the spherical form of the contacting surfaces of the members 14 and 15 which support the thrust bearing, the latter is substantially self-aligning, since the member 15 may move relatively to the member 14 as required to maintain the center of gravity of the rotating structure in the axis of rotation of that structure following any lateral adjustment of the upper end of the post 10. The maintenance of a desirable relative disposition of the parts is facilitated by making the diameter of the recess seat in the underside of the member 14 somewhat larger than the external diameter of the upper end of the post 10 as shown in Fig. 7. The member 14 is then able to move horizontally relative to the post 10 to reduce any significant difference in the contact pressures with which the different bearing blocks 41 engage the outer surfaces of the sealing member 30. With the preferred arrangement shown, the center of gravity of the rotating structure is at a level substantially below the thrust bearing carried at the top of the center column 10. Such relative location of the center of gravity and the thrust bearing contributes to stable operation and a desirably small tendency of the rotating structure to sway or oscillate as a result of wind pressure and other causes.

While in accordance with the provisions of the statutes, I have illustrated and described the best form of embodiment of my invention now known to me, it will be apparent to those skilled in the art that changes may be made in the form of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent, is:

1. In a liquid distributor for filter beds and the like, the combination of a stationary supporting structure comprising a hollow central pier and a center post having its lower end anchored in said structure and having an upper portion above said hollow pier and having a lower portion centrally disposed in said hollow pier and separated from the inner wall of the pier by a vertically elongated annular liquid space above the anchored lower end of said central post, means engaging said post at a level intermediate the ends of the annular liquid space in said hollow pier and connecting said post to said pier and longitudinally adjustable relative to the pier to move the upper end of said post horizontally relative to the anchored lower end of the post, a rotative structure comprising liquid distribution pipes with inlets adjacent said post and with discharge outlets at different distances from said post, and also comprising a central liquid chamber above the annular liquid space within said pier and with an opening at its lower end through which said post extends and through which liquid passes from said annular space into said chamber and thence into said pipe inlets, an uprising annular sealing member mounted on said pier and a cooperating annular sealing member supported by said rotative structure and depending from a portion thereof surrounding the open lower end of said liquid chamber, and means for passing liquid into the annular space in said pier at a pressure high enough to move the liquid into said pipe inlets.

2. A liquid distributor combination as specified in claim 1, in which the adjustable means engaging said post comprises a plurality of threaded connections between said post and surrounding pier and angularly displaced from one another about the post.

3. In a liquid distributor for filter beds and the like, the combination of a stationary supporting structure comprising a central pier having a hollow body portion formed of concrete and a concrete bottom portion beneath said body portion and rigidly connected thereto and having a liquid port in the lower portion of said concrete pier and a center post having its lower end extending into and anchored in said concrete bottom portion of the central pier and having an intermediate portion separated from the inner wall of the pier by a vertically elongated annular liquid space above said pier bottom portion and into the lower portion of which said port opens, a rotating structure, bearing means through which said rotating structure is rotatably mounted on the upper portion of said center post, said rotating structure comprising liquid distribution pipes with inlets adjacent said post, and with discharge outlets at different distances from said post and also comprising a central liquid chamber above the annular liquid space within said pier and with an opening at its lower end through which said post extends and through which liquid passes from said annular space into said chamber and thence into said pipe inlets, an uprising annular sealing member mounted on said pier and a cooperating annular sealing member supported by said rotating structure and depending from a portion thereof surrounding the open lower end of said liquid chamber, and means for passing liquid into the annular space in said pier at a pressure high enough to move the liquid into said pipe inlets.

4. A liquid distributor combination as specified in claim 3, in which said bearing means is self aligning and comprises a first supporting member seated on the upper end of said post and formed with a curved upper surface, a second supporting member having a lower curved surface abutting against and resting on said curved upper surface, one of said surfaces being convex and the other being concave, and thrust bearing means supported by said second supporting member through which the weight of said rotating structure is transmitted to said post.

JOHN HERBERT KNOWLES.

REFERENCES CITED

The following references are of record in the file of this patent:

UNITED STATES PATENTS

| Number | Name | Date |
|---|---|---|
| 551,754 | Bryant | Dec. 24, 1895 |
| 569,656 | McIntyre | Oct. 20, 1896 |
| 843,971 | Stevens | Feb. 12, 1907 |
| 1,078,727 | Geiger | Nov. 18, 1913 |
| 1,392,476 | Boedeker | Oct. 4, 1921 |
| 1,450,309 | Ross | Apr. 3, 1923 |
| 1,516,429 | Hartley et al. | Nov. 18, 1924 |
| 1,882,546 | Brossman | Oct. 11, 1932 |
| 2,215,181 | Knowles et al. | Sept. 17, 1940 |
| 2,255,157 | Friend et al. | Sept. 9, 1941 |
| 2,263,125 | Friend et al. | Nov. 18, 1941 |
| 2,301,025 | Friend et al. | Nov. 3, 1942 |
| 2,374,977 | Bunnell | May 1, 1945 |

FOREIGN PATENTS

| Number | Country | Date |
|---|---|---|
| 10,940 | Great Britain | May 10, 1906 |
| 279,536 | Great Britain | Nov. 2, 1927 |